Aug. 9, 1960    J. L. TULLIS    2,948,462
SEPARATION CENTRIFUGE
Original Filed April 12, 1955    6 Sheets-Sheet 6

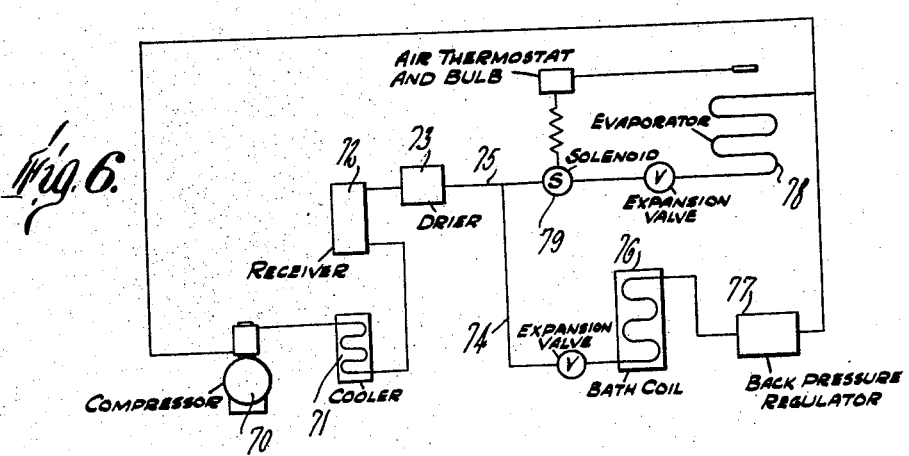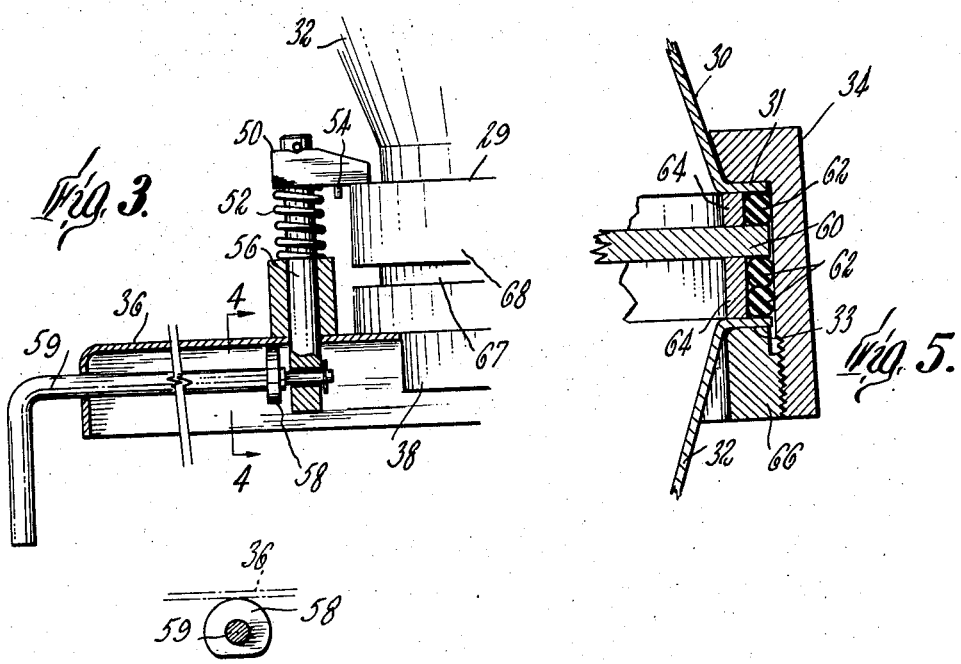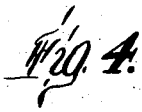

United States Patent Office 2,948,462
Patented Aug. 9, 1960

2,948,462

SEPARATION CENTRIFUGE

James L. Tullis, Newton, Mass., assignor to Protein Foundation, Incorporated, Cambridge, Mass., a corporation of Massachusetts Original application Apr. 12, 1955, Ser. No. 500,746. Divided and this application Jan. 23, 1959, Ser. No. 792,454

4 Claims. (Cl. 233—15)

This invention relates to centrifugation and, more particularly, to centrifugal apparatus useful in the separation of the various components of animal blood, though it may equally well be used in the separation of components, having different specific gravities, of other liquids, and is a division of my co-pending application Serial No. 500,746 filed April 12, 1955 and now Patent No. 2,906,452.

In U.S. Patent applications Serial Nos. 281,988, and 281,989, filed April 12, 1952, and now Patent Numbers 2,822,126 and 2,822,315 respectively and of common ownership with the present application are described both centrifugal apparatus and methods of separation of tremendous value in effecting separation of the cellular components of animal blood from plasma, as well as in the separation of the various protein constituents of plasma.

The present invention is directed to improvements in such apparatus, which provide improved separation, sterility, and ease of operation. More specifically, it is a particular object of the present invention to provide novel continuous feed centrifuge bowl structures for carrying out various separations of the elements of whole blood, that is, red blood cells, white blood cells, platelets and plasma which differ in specific gravity, as well as to separate such components from other liquids, and especially the collection and washing of red blood cells, and the separation of platelets or other cellular components from plasma.

It is a particular feature of the invention that the centrifuge bowl structures provided have interchangeable parts wherein desired bowl structures may readily be assembled.

Various other objects and features of the invention will become apparent from the following description of preferred embodiments thereof, together with the accompanying drawings, wherein:

Fig. 3 is an enlarged detail view, partly in cross section of a portion of the apparatus of Fig. 1;

Fig. 4 is a partial cross-sectional view of the apparatus of Fig. 3, taken on the line 4—4 thereof;

Fig. 5 is an enlarged detail cross-sectional view of another portion of the apparatus of Fig. 1;

Fig. 6 is a diagrammatic view of the cooling system of the apparatus of Fig. 1;

Figure 1:
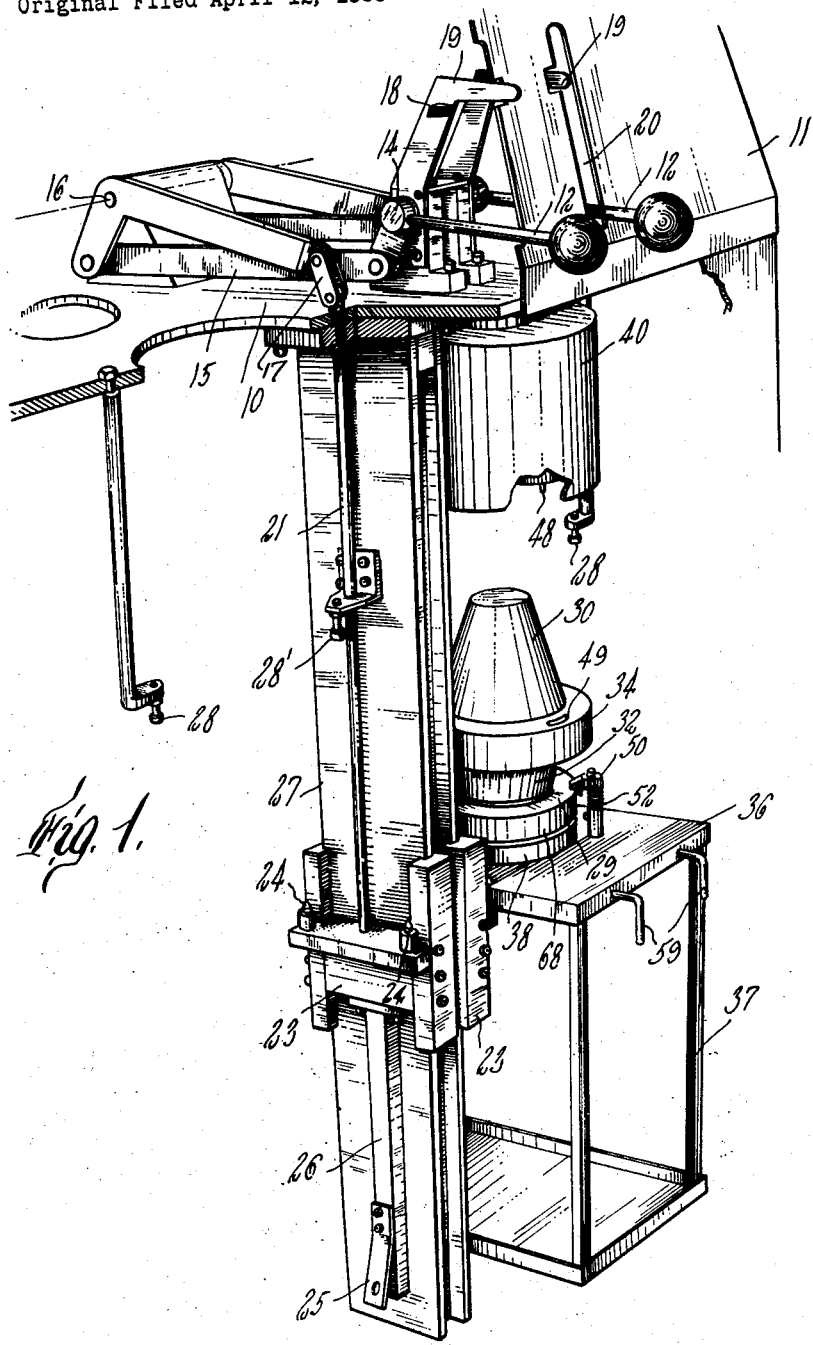
Fig. 1 is an isometric view, partly broken away, showing the apparatus of the invention.

In Fig. 1 is shown the general arrangement of the apparatus, and in particular the elevator mechanism for raising the centrifuge bowl structure into driving relationship with its driving mechanism. On the right hand, the driving mechanism, centrifuge bowl, and supporting structure are shown; in the actual apparatus these would also be present on the left hand side, but are herein broken away so that the elevator mechanism can be clearly shown.

The elevator mechanism is mounted on main frame supporting plate 10 and is actuated by handles 12, which handles extend through slots 20 in the front panel 11 of the apparatus. Said handles form one leg of a first bell crank pivoted at 14 on plate 10, the other leg of which is connected through link 15 to one leg of a second bell crank pivoted at 16 on said plate. The other leg of said second bell crank is connected by a short link 17 to elevator rod 21. When handle 12 is in raised position, it slips behind catch 18 in spring 19, which latter is pushed into slot 20 in front panel 11. Handle 12 is thereby releasably held in raised position during the centrifuging. The raising of handle 12, through the above described linkage system, causes elevator rod 21 to move upwardly, carrying with it a supporting assembly which consists of sliding elements 23 attached to said rods, supporting pins 24 mounted thereon, spring 25 and spring supporting rod 26 mounted on said elements. The slides 23 slide on tracks on elevator posts 27 affixed to and extending downwardly from plate 10. Four adjustable stops 28, 28' are provided for limiting the upward travel of the supporting assembly of which three are shown, two of said stops 28 being mounted on plate 10 and two of said stops 28' on elevator posts 27. These are provided with threads so that they can be positioned as required.

On the right hand side of Fig. 1 is shown the centrifuge bowl, its driving mechanism, and its supporting structure. The latter supports the bowl and also holds the collecting receptacles (not shown).

The centrifuge bowl will be later more fully described, but in general includes a top bowl 30 of generally conical shape, a bottom bowl 32 also of conical shape, an intermediate ring 60 therebetween, and a compression arrangement including outer compression ring 34 holding the two bowls and the ring together. The bowls and other elements which come in contact with blood are preferably of stainless steel with a silicone coating. The bottom bowl 32 is rotatably mounted on a base which consists of a table portion 36 with a cylindrical rim 38 removably mounted therein for directly supporting lower bowl 32. A frame 37 extends downwardly from table portion 36. Said table portion is supported on spaced apart pins 24 with frame 37 bearing against spring 25.

The driving mechanism for the bowl consists of a magnetic chuck 40 rotatably mounted on supporting plate 10 and driven from a suitable electric motor (not shown). The chuck 40 includes an annular bottom surface having mounted therein in suitable non-magnetic material, a plurality of magnets adapted to contact the upper surface of compression ring 34. A driving pin 48 is mounted in said annular bottom surface for engaging driving slot 49 in compression ring 34 to positively drive said bowl. To assemble the structure, frame 37 carrying table 36 is first placed on frame locating pins 24, as shown in Fig. 1. The elevator mechanism is then actuated by raising handle 12 until table 36 hits the outside stop 28. Further slight raising of handle 12 brings the frame in contact with inside stop 28', thereby compressing spring 25 and locating the top bowl 30 in proper relation to chuck 40.

Fig. 3 shows the detail of the bowl hold-down assemblies which consist of a clamping dog 50, a compression spring 52, a locating pin 54 mounted on said dog, a supporting rod 56 on which said dog and spring are mounted;

a cam 58 and an actuating lever 59. As shown in Fig. 3, if lever 59 is rotated so that the flat face of cam 58 (Fig. 4) is at the top in contact with a lower surface of table 36, compression spring 52 will lift dog 50 away from lower flange 29 of bottom bowl 32. Pin 54 is provided in order to assure the centering of the bowl.

In assembling the equipment for operation, the parts of the centrifuge bowl are assembled as shown in Fig. 1, and the assembled structure is then clamped by dogs 50 (of which two are provided for each bowl). The bowl is then raised by the elevator mechanism, as already described, into the proper position with respect to chuck 40. Dog 50 is then released by moving levers 59 so that the bowl can be spun.

With the multiple piece centrifuge bowl as herein described, it is important that a fluid tight seal be provided between the top and bottom centrifuge bowls and the intermediate ring. Thus, as shown in Fig. 5, the top bowl 30 has an outwardly extending annular flange 31 at its lower edge, and the bottom bowl 32 has a similar flange 33 at its upper edge. A supporting member for internal elements of the centrifuge, as hereinafter described, comprising an annular ring 60, is interposed between the flanges, and suitable sealing means comprising O rings 62 are interposed between ring 60 and flanges 31, 33 respectively. Spacing rings 64 are also interposed between ring 60 and flanges 31, 33 radially inwardly of the O rings 62 to limit the movement of flanges 31, 33 toward one another, said spacing rings being of a dimension somewhat less than that of the uncompressed O rings 62. Thus, a predetermined overall dimension of the assembled centrifuge can be provided, yet with adequate sealing. The opposed flanges 31, 33 are urged together by outer compression ring 34 and an inner cooperating locking ring 66, the outer compression ring having an inwardly extending flange which fits over top bowl flange 31. The downwardly extending skirt of said compression ring is screw threaded on its inner surface to cooperate with the screw threaded outer surface of locking ring 66, the upper surface of said latter ring contacting the bottom bowl flange as it is screwed into place to clamp flanges 31, 33 together.

Figure 7:
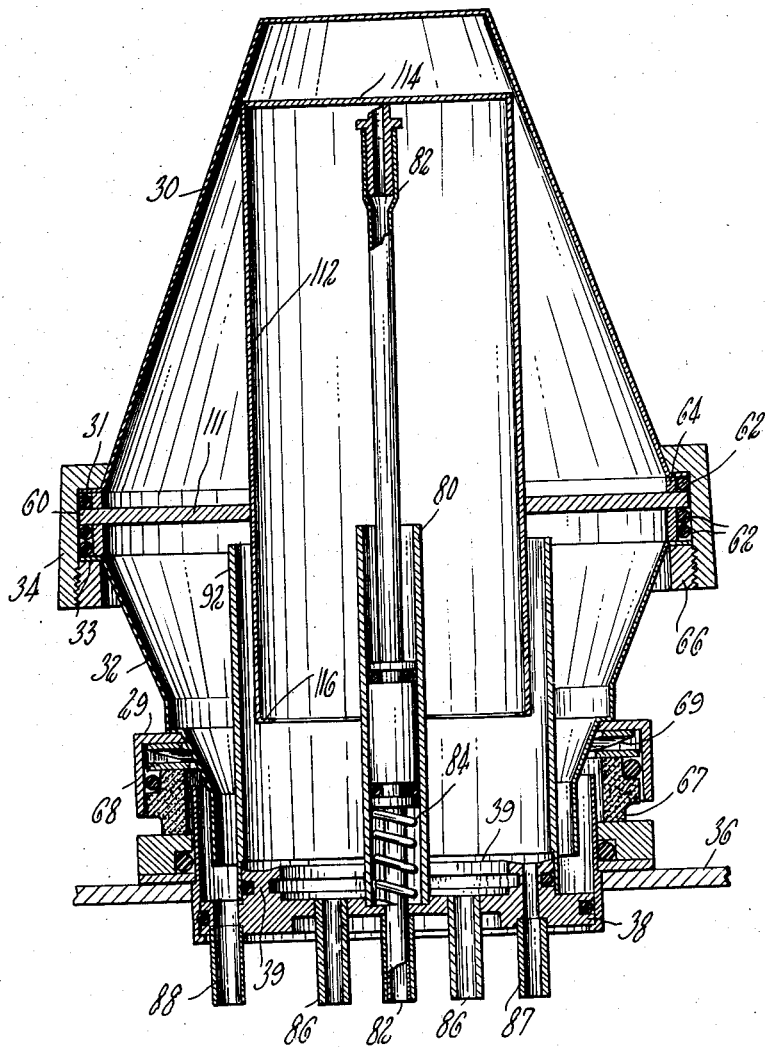
Fig. 7 is a cross-sectional view showing the interior structure of the centrifuge bowl.
Figure 8:
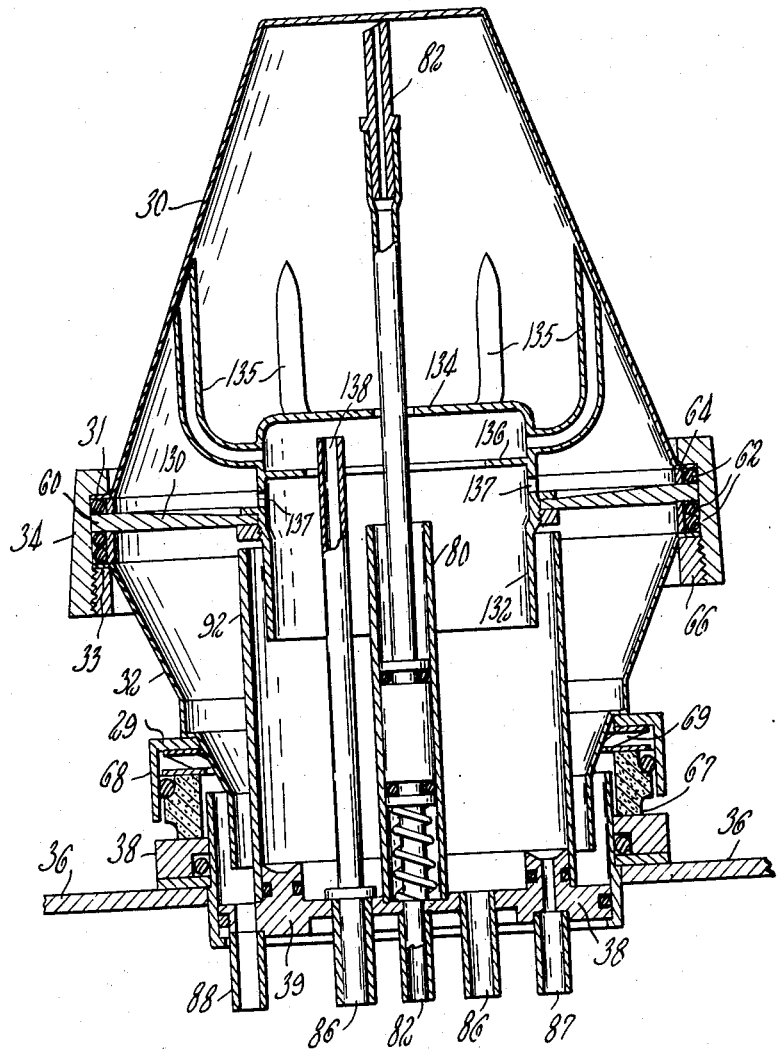
Fig. 8 is a cross-sectional view showing another interior structure of the centrifuge bowl.
Figure 9:
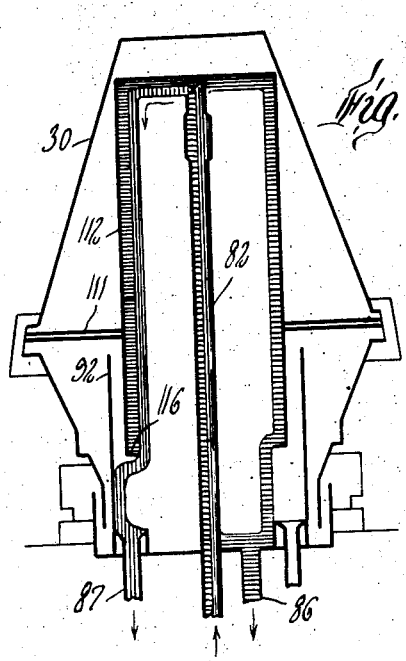
Figs. 9–10 are diagrammatic views showing the operation of the bowl structures of Figs. 7 and 8.
Figure 10:
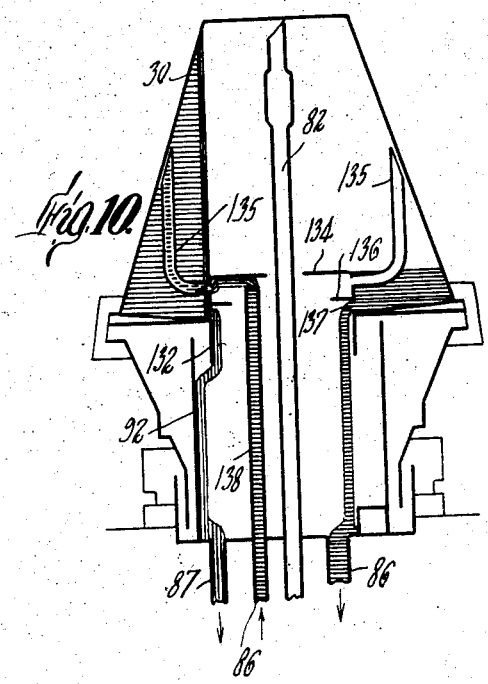

Figs. 7 and 8 show the centrifuge bowl structure with various interior arrangements, and Figs. 9–10 the operation of said bowl structures wherein the left half shows the bowl running for the collection of one blood component, and the right half the bowl stopped or decelerating for collection of another component. It will be noted that the outside of the bowl is the same in each case and only its interior structure has been changed.

Figure 2:
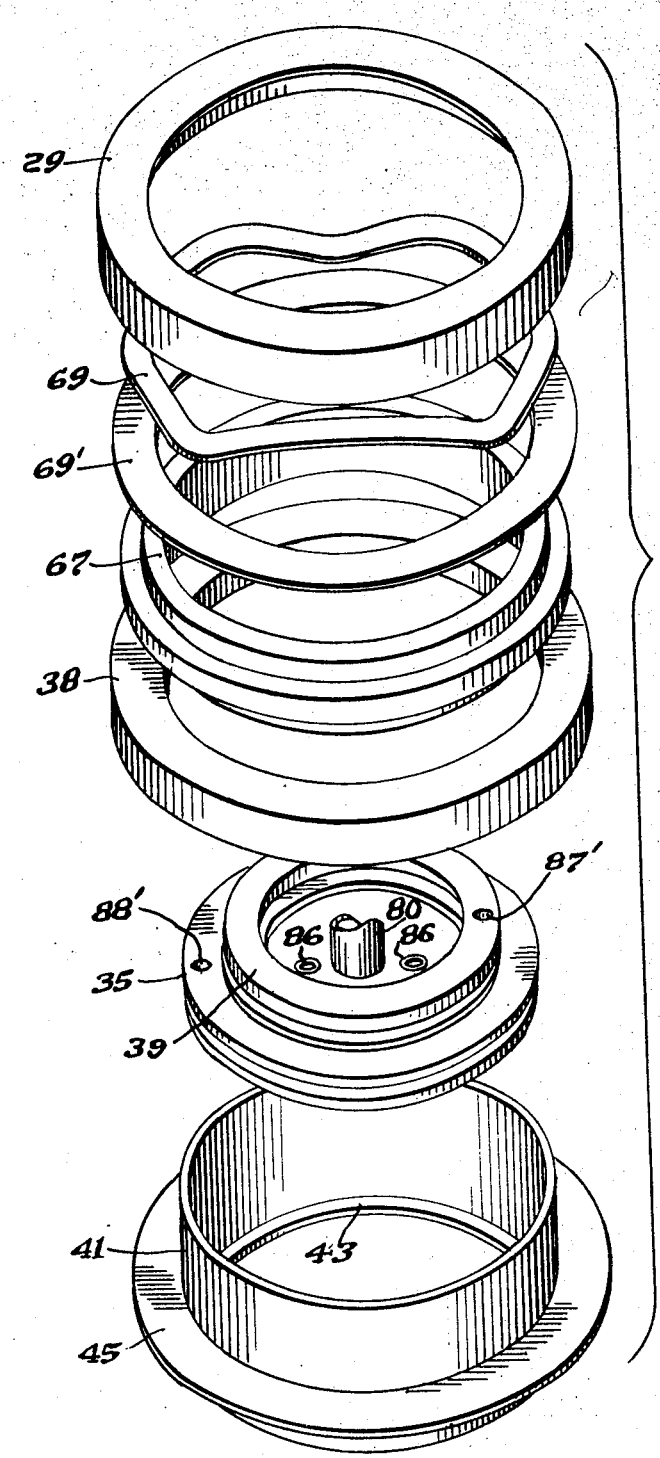
Fig. 2 is an exploded isometric view of a portion of the apparatus of Fig. 1.

As to the bowl structure common to all of the modifications best shown in Fig. 2, the parts of the bowl are assembled on a cylindrical flanged base assembly consisting of base member 35 with a surrounding tubular member 41 having an inwardly extending flange 43 positioned beneath the outer periphery of base member 35 to support said base member therein, said assembly being adapted to fit into an opening in table 36 with its outer flange 45 interposed between said table and removable rim 38 to support the base assembly on said table. The upper surface of the rim 38 acts as a running surface for a sealing member 67 of low-friction material, said sealing member being supported between said rim and flange 29 by a skirt 68 thereon. A waved spring washer 69 and underlying flat washer 69' are provided interposed between said sealing member and said flange. Spring washer 69 controls the pressure therebetween when clamping ring 34 is tight (and hence when the bowl is properly assembled) with flange 29 in driving engagement with the cooperating surface on lower bowl 32. A suitable O ring seal is provided between member 67 and skirt 68.

The base member 35 has mounted centrally thereof an upstanding stationary feed tube housing 80, said housing having slidably mounted therein a feed tube 82 with a compression spring 84 interposed between said feed tube and said base to normally urge said feed tube upwardly. The feed tube extends downwardly through base member 35 to a suitable connector so that blood from a donor or other reservoir may be fed to the centrifuge. An upstanding circular flange 39 is provided on the base, such flange being spaced between the inner and outer radial extent of the base. A plurality of openings are provided in said base in addition to said central opening for carrying away liquids discharged from the centrifuge to suitable glass or plastic containers, for example. Thus inner openings having downwardly extending tubes 86 are provided in base member 35 between its flange 39 and feed tube housing 80, one or more openings 87' having tubes 87 are provided in said flange surface, and an opening 88' having a vent tube 88 is provided in said base outwardly of flange 39 within lower bowl 32.

In Fig. 7 is shown a centrifuge structure especially adapted for separating cellular components, for example white cells from a mixture of white cells and plasma or platelets from a mixture of platelets and plasma. It is equally useful for concentrating any particular substance present in small quantity in a large volume of diluent. In this structure, the supporting baffle 60 is provided with a central cylindrical member 112 extending upwardly and downwardly therefrom inside of collector ring 92. A top wall 114 is provided for said member, and it has at its bottom edge an inwardly extending flange 116. The feed tube 82 in this arrangement extends to the inside surface of top wall 114.

In the operation of this structure, as shown in Fig. 9, the mixture of platelets and plasma is passed upwardly through feed tube 82 and flows downwardly along member 112. The platelets are held along wall 112, while the plasma passes downwardly into and through tube 87. The flange 116 retains sufficient plasma to reduce the washing effect of the plasma on the platelets and thus aid in keeping them on side 112. When the collecting chamber, as formed by flange 116, side wall 112, and top 114 has collected a sufficient quantity of platelets, the centrifuge is slowly decelerated to permit the plasma held by said flange to pass out of the centrifuge. The platelets are then removed from wall 112 by passing a suitable wash solution through feed tube 82 while the centrifuge is spinning. The centrifuge is then abruptly stopped. Since the liquid tends to continue spinning, the resulting turbulence of the liquid will re-suspend the concentrated platelets and they will then flow downwardly and pass from the centrifuge through tubes 86, valves again being used so that the plasma and platelets may be fed to separate containers.

The centrifuge bowl structure of Fig. 8 is especially adapted for collecting red cells and washing white cells therefrom. In this structure, the central baffle 130 supports centrally thereof a cylindrical element 132 extending upwardly and downwardly therefrom. Said cylindrical element 132 has an inwardly extending flange 134 at its upper end and another inwardly extending flange 136 spaced therebelow. A plurality of jet tubes 135 are mounted on said element and extend outwardly and upwardly therefrom forming passages extending from the inner surface of said element between its flanges to a point closely adjacent the inner surface of upper bowl 30 about midway up its side wall. Holes 137 through said element 132 are positioned closely adjacent the upper surface of central baffle 130. An axially displaced feed tube 138 extends upwardly from tube 86 in said base beyond lower flange 136 to a point closely adjacent upper flange 134. The usual feed tube 82 extends centrally upwardly to a point closely adjacent the top wall of bowl 30, and outer collector ring 92 extends upwardly and radially outwardly of the downwardly extending portion of element 132.

In the operation of this structure, blood is passed upwardly through central feed tube 82 as before, and the red cells collect in the compartment formed by the side wall of upper bowl 30, with the plasma and other components passing downwardly through openings 137 along element 132 and collecting ring 92 until they are discharged through tube 87. As shown in Fig. 10, the red cells are then washed by plasma or other liquid by passing said liquid upwardly through displaced feed tube 138. From the top of said feed tube, it moves radially outwardly between flanges 134, 136, and thence through jet tubes 135 into the collected red blood cells, which remain collected at the outer edge of the upper bowl 30 above baffle 130, while the wash liquid, being of lower specific gravity, passes through openings 137 downwardly along the inner surface of element 132 and collecting ring 92 into tube 87 from whence it discharges into a suitable container. When the centrifuge is decelerated, the collected red blood cells flow downwardly through openings 137 to opening 86 in base member 35 and thence to a suitable container. Valves are used so that the plasma, the wash liquid, and the red blood cells can be collected separately.

This structure can also be used without a wash step by overfilling the capacity of the red cell collection compartment.

As will be apparent from the above description of the various types of centrifuge bowl structures shown in Figs. 7–8, the common centrifuge elements may be assembled with a variety of internal centrifuge elements to provide separation of the cellular components of blood or other biological fluids, such as milk. Also, the separation of many other liquids, emulsions, and suspensions may be accomplished by these centrifuge structures, since a difference in the specific gravity of the components to be separated is all that is required. Furthermore, more than one component may be rapidly separated by using more than one centrifuge. Thus, with the two unit arrangement as shown in Fig. 1, one of the centrifuge bowls may be used to separate the red blood cells, and the plasma with other components may be passed directly to the second centrifuge bowl to separate a further component. This arrangement could be readily extended to separate continuously even more components by using more centrifuge bowls assembled with the proper interior elements.

For stability of the separated blood components, it is important that the blood be kept cool, and that it be cooled before it passes from the donor into the centrifuge. Thus, as shown in Fig. 6, a refrigeration unit is associated with the apparatus both to cool the blood before it enters the centrifuge bowl and to air cool the compartment housing the centrifuge assemblies. Freon or other refrigerant is compressed in compressor 70, cooled in after-cooler 71, passed through receiver 72 and drier 73 and split into two streams shown in the drawings as 74 and 75. Stream 74 is expanded and cools bath coil 76 which cools the blood from the donor prior to sending it to the centrifuge operation. The expanded refrigerant then passes through back pressure regulator 77 and thence back to the compressor. Stream 75 passes through evaporator 78 where it cools the air inside the apparatus around the bowl. It then returns to compressor 70. The bath coil is at a higher temperature than that in evaporator 78. Thus the pressure of the refrigerant is always controlled in line 74, by regulator 77 (since the pressure in the bath coil will be higher than that in evaporator 78). The solenoid 79 is actuated by the thermostat and opens when the air temperature rises. The compressor runs continuously, and if there is no load on the system, it merely discharges into the receiver 72. By this arrangement it is possible to use a single compressor to provide two different temperatures which are controlled independently of each other.

To summarize the operation of the above described apparatus, assuming that blood is to be taken from a donor and that the red cells are to be removed therefrom, the centrifuge bowl is first assembled as shown in Figs. 7–10. Suitable containers are then connected to its outlet tubes and it is then sterilized with steam. It is then mounted on table 36 as shown in Fig. 1. The elevator mechanism is then operated to raise the centrifuge bowl upwardly to its driving mechanism, and dogs 50 are then released so that the bowl will be released with lower bowl 32 in driving contact with flange 29 and upper bowl 30 seated in chuck 40 and held therein by magnets 44. The chuck 40 is then rotated to spin the bowl. Blood from a donor is first passed through a resin column or a reservoir of any desired anti-coagulant solution to prevent coagulation, then cooled, and finally passed into the spinning centrifuge. The red blood cells will collect as above described until they fill the red cell compartment. During this time, the plasma and other blood components pass through the centrifuge into their container. When the red cell compartment is filled, the centrifuge is decelerated and the red cells allowed to drain into another container.

The centrifuge bowl is then stopped and disengaged from its driving mechanism by clamping dogs 50 to pull it away from chuck 40 and then lowering it by the elevator mechanism. The containers may then be removed and the centrifuge bowl taken apart for cleaning.

Thus, it is apparent that the invention has provided a novel apparatus for separating components from blood during the actual phlebotomy, which apparatus results in improved separation, closed-system sterility and ease of operation. Various modifications of the apparatus, not herein disclosed, within the spirit of the invention and the scope of the appended claims will occur to those skilled in the art.

I claim:

1. A centrifuge comprising a bottom bowl and a closed top bowl having a central opening therein at the bottom of the bowl, and an outwardly and downwardly flaring conical side wall, a stationary base positioned beneath said central opening, sealing means interposed between said base and said bottom bowl, an internal centrifuge element having a central baffle consisting of a flat circular plate fitting within said bowl and extending radially inwardly thereof with a central opening, a cylindrical member extending upwardly therefrom and having a plurality of jet tubes extending radially outwardly and upwardly toward the side wall of said bowl forming passages from the inner surfaces of said cylindrical member to a point closely adjacent said side wall, inwardly extending flanges spaced above and below the lower opening of said tubes on the inner surface of the cylindrical member, and a passage adjacent the innermost edge of said central baffle extending toward said bottom opening, stationary feed means extending upwardly from said base through said bottom opening and displaced from the axis of rotation of said centrifuge, said feed means terminating radially inwardly of said tubes, and means disposed below said bottom opening for collecting liquid discharged from said centrifuge, said centrifuge being adapted for rotation about a vertical axis, whereby liquids discharged from said centrifuge during spinning thereof may be collected separately from liquids discharged when said centrifuge is stopped.

2. A centrifuge as claimed in claim 1 including further stationary feed means extending upwardly through said base centrally thereof and terminating adjacent the top wall of said top bowl.

3. A centrifuge comprising a bottom bowl having a central opening therein at the bottom of the bowl, a side wall, and an outwardly extending annular flange at the upper edge of said wall, a stationary base positioned beneath said central opening, sealing means interposed between said base and said bottom bowl, a top bowl having a top wall, an outwardly and downwardly flaring conical side wall and an outwardly extending annular flange at the lower edge of said wall, an internal centrifuge element having a central baffle consisting of a flat circular plate with its annular edge positioned between said opposed flanges and extending radially inwardly thereof with a central opening, a cylindrical member extending upwardly therefrom and having a plurality of jet tubes extending radially outwardly and upwardly toward the side wall of said top bowl forming passages from the inner surface of said cylindrical member to a point closely adjacent said side wall, inwardly extending flanges spaced above and below the lower opening of said tubes on the inner surface of the cylindrical member, and a passage adjacent the innermost edge of said central baffle extending toward said bottom opening, clamping means for clamping said bowl flanges toward one another into firm pressure contact with said central baffle to seal said centrifuge, stationary feed means including a first tube extending upwardly from said base through said bottom opening and displaced from the axis of rotation of said centrifuge and terminating radially inwardly of said tubes below said flange, and a second tube extending upwardly through said bottom opening centrally thereof and extending to the top wall of said bowl, and means disposed below said bottom opening for collecting liquid discharged from said centrifuge, said centrifuge being adapted for rotation about a vertical axis, whereby liquids discharged from said centrifuge during spinning thereof may be collected separately from liquids discharged when said centrifuge is stopped.

4. A centrifuge as claimed in claim 3 wherein said means for collecting liquid discharged from the centrifuge includes a collecting ring extending upwardly from said base, and openings through said base, and wherein said cylindrical member extends downwardly from said baffle radially inwardly of said collecting means and said passage adjacent the innermost edge of said central opening extends through said cylindrical member.

References Cited in the file of this patent

UNITED STATES PATENTS

| | | |
|---|---|---|
| 529,664 | Naylor | Nov. 20, 1894 |
| 2,678,159 | Ellis | May 11, 1954 |